United States Patent [19]

Thorfinnson et al.

[11] Patent Number: 4,778,716

[45] Date of Patent: Oct. 18, 1988

[54] METHOD OF INCREASING THE TOUGHNESS OF FIBER-REINFORCED COMPOSITES WITHOUT LOSS OF MODULUS

[75] Inventors: Bradley S. Thorfinnson, Orange; Thomas J. Folda, Placentia, both of Calif.

[73] Assignee: BASF Corporation, Parsippany, N.J.

[21] Appl. No.: 30,475

[22] Filed: Mar. 26, 1987

[51] Int. Cl.$^4$ ................................................ B32B 5/02
[52] U.S. Cl. .................................... 428/236; 428/285; 428/286; 428/903
[58] Field of Search ................ 428/236, 285, 286, 903

[56] References Cited

U.S. PATENT DOCUMENTS 4,642,271  2/1987  Rice ..................................... 428/903

Primary Examiner—Marion C. McCamish
Attorney, Agent, or Firm—William G. Conger

[57] ABSTRACT

Inclusion of minor amounts of predominately amorphous silica microfibers into thermosetting matrix resins allow manufacture of prepregs which produce toughened composites resistant to impact damage without the loss of modulus normally associated with toughened resin systems.

24 Claims, No Drawings

METHOD OF INCREASING THE TOUGHNESS OF FIBER-REINFORCED COMPOSITES WITHOUT LOSS OF MODULUS

FIELD OF THE INVENTION

The subject invention relates to heat-curable, fiber-reinforced prepregs, heat-curable assemblies of such prepregs, and cured, advanced composites prepared therefrom. More particularly, the subject invention relates to the addition of a selected group of microfibers to the matrix resin component of fiber-reinforced, heat curable prepregs. The addition of such microfibers is effective to increase the toughness of composites prepared from such prepregs without experiencing a loss of modulus or gaining toughness at the expense of lowering the glass transition temperature.

DESCRIPTION OF THE RELATED ART

Advanced structural composites are high modulus, high strength materials useful in many applications requiring high strength to weight ratios, particularly applications in the aerospace industry. Such composites are generally constructed by preparing a laminated structure whose individual plies consist of heat-curable, matrix-resin-impregnated, fiber-reinforced layers generally termed "prepreg."

Such prepreg is manufactured by a variety of methods, the most common of which involves either solution impregnation or thin-film melt impregnation of a fiber substrate. In the solution impregnation process, plies of unidirectional fiber tow, yarn, woven cloth, or non-woven mat, the reinforcing fibers of which are substantially continuous, are immersed in a solution or dispersion of thermosetting matrix resin. The solvent is then evaporated. In the thin-film melt impregnation technique, thin films of matrix resin are placed on one or both sides of the fiber reinforcing material. The matrix resin is then forced into the fiber substrate through the application of heat and pressure. Prepreg prepared by either method generally contains from 15 to 60 percent by weight of resin, depending upon the application.

Suitable fiber substrates useful in preparing high performance prepregs include glass, carbon/graphite, boron, aramid, high strength polyethylene and the like. These fibers may be used in the form of tape, tow, roving, non-woven mat, or woven cloth. The fibers are substantially continuous, i.e. they have very high aspect ratios (ratio of length to diameter) as opposed to short, non-continuous, or chopped fibers.

One of the drawbacks of advanced composites prepared from fiber-reinforced prepregs is a tendency toward excessive damage arising from sudden impact. The ability of a composite to withstand impact-induced damage is referred to as "toughness." In the past, composites having improved toughness were prepared at the expense of tensile modulus, compressive strength, and resin glass transition temperature. Common means of imparting toughness are adding elastomeric fillers such as carboxyl, amino, or sulfhydryl terminated polyacrylonitrile-butadiene elastomers, incorporating considerable amounts of thermoplastics such as polyether ether ketones or polysulfones into the thermosetting matrix resin; or decreasing the cross-link density of the resin by utilizing higher molecular weight monomers or monomers of lower functionality.

While these prior art methods are effective to increase the toughness of composites, this increase in toughness occurs at the expense of tensile modulus and compressive strength, and thus the finished composite must be made thicker and heavier to maintain design parameters. The result is a considerable decrease in the strength/weight ratio, and an inability of the matrix resin to fully translate, and therefore take advantage of, the high strength/modulus properties of the fiber-reinforcing substrate. Thus there is a need for resin systems which afford composites with improved impact properties without a loss of modulus. Only then can the superior properties of advanced fibers be translated fully into impact resistant, high performance composites.

SUMMARY OF THE INVENTION

It has now been discovered that when selected microfibers are added in appropriate amounts to thermosetting matrix resins, fiber reinforced articles such as prepregs may be produced which can be used to prepare composites having improved impact resistance, or "toughness," without a loss in compressive strength, modulus, or glass transition temperature. Such prepregs may be used to prepare advanced structural composites which maintain the benefits of high strength/weight ratios and high temperature performance while being resistant to damage produced by sudden impact.

DESCRIPTION OF THE PREFERRED EMBODIMENTS

The prepregs of the subject invention consist of fiber reinforcement in the form of unidirectional, randomly oriented, or woven fiber reinforcement of glass, aramid, high tensile synthetic polymers, or carbon/graphite. Carbon/graphite fiber reinforcement is preferred. The fiber reinforcement is impregnated using conventional techniques with from 15 to about 60 percent by weight, preferably from 30 to 50 percent by weight, and most preferably from about 30 percent to about 35 percent by weight of a heat-curable thermosetting resin.

The thermosetting resin may be an epoxy resin, a bismaleimide resin, a cyanate resin, mixtures thereof, or other high performance matrix resin system. The matrix resin may contain unsaturated, particularly multiply unsaturated co-monomers of the acetylenic, vinylic, acrylic, or allylic types.

Examples of suitable epoxy resins are the di- and polyglycidyl ethers of hydroxyl functional compounds such as the bisphenols, i.e. bisphenol A, bisphenol F, and bisphenol S; hydroquinone; cyclohexanedimethanol; and resorcinol; glycidyl amines such as the reaction products of epichlorohydrin with amines such as aniline, toluenediamine, methylenedianiline; glycidyl compounds of mixed hydroxyamines such as the aminophenols; and the various novolak resins. Many such epoxy resins are commercially available and are well known to those skilled in the art.

The epoxy resins may be used alone when a suitable catalyst is present; in conjunction with traditional epoxy resin curing agents; or with curing agents and catalysts. Curing agents of the amine or anhydride type are preferred. Suitable amine curing agents, for example, are the methylenedianilines, toluenediamines, diaminodiphenyloxides, diaminodiphenylsulfides, and diaminodiphenylsulfones. Mono- or bis[mono-N-alkyl]-derivatives of these amines are also suitable. Suitable anhydride curing agents are polysebacic polyanhydride, succinic anhydride, maleic anhydride, nadic anhydride, hexahydrophthalic anhydride, phthalic anhydride, and pyromellitic anhydride. Substituted anhydrides are also suitable. All common epoxy catalysts are suitable, for example, various imidazoles, tertiary amines, and boron trifluoride complexes.

Maleimide-group-containing resins may include bismaleimides, polymaleimides, or polyaminobismaleimides. Such maleimides are conveniently synthesized, for example, by reacting maleic anhydride or substituted maleic anhydrides with a di- or polyamine. Examples of suitable di- or polyamines are those listed above as epoxy curatives. However, many other di- or polyamines are also suitable. The polyaminobis- or polymaleimides may be prepared by reacting one or more of the bis- or polymaleimides with additional quantities of one or more di- or polyamines to form higher molecular weight prepolymers.

Cyanate-functional resins are generally prepared by reacting cyanogen bromide with an alcohol or phenol. Suitable cyanate-functional resins, for example, are 1,2-, 1,3-, and 1,4-dicyanatobenzene and 2,2'-, 3,3'-, and 4,4'-dicyanatodiphenylmethane and the dicyanates prepared from bisphenol A, bisphenol F, and bisphenol S. Tri- and higher functional cyanate resins are also suitable.

Examples of unsaturated co-monomers include bisphenol A dimethyacrylate, diallylphthalate, 2,2'-diallylbisphenol A, and allylisocyanurate. The thermosetting matrix resin may contain a minor amount, i.e. up to about 35 percent by weight, of a thermoplastic resin such as a polyimide, polyamide, polyamideimide, polycarbonate, polyether ketone, polyphenyloxide, or polysulfone.

The microfibers useful for the practice of the subject invention differ from conventional whiskers made from inorganic materials which may have diameters of from 5 to 10 $\mu$m. By way of contrast, the microfibers of the subject invention have diameters of from 1 to 70 nm and aspect ratios of preferably from about 10 to 100. The microfibers consist of from 60 to 80 percent by weight of amorphous silica, and from 5 to 25 percent by weight of elemental silicon. It is essential that the microfibers contain not more than 5 to 8 percent by weight, and preferably less than 4 percent by weight of silicon carbide.

A typical microfiber analysis is as follows:

| Component | % by weight |
| --- | --- |
| Amorphous fused silica | 75.6 |
| Elemental silicon | 18.3 |
| Elemental carbon | 3.8 |
| Silicon carbide | 2.0 |
| Nitrogen | 0.3 |

Such microfibers are available from the J. M. Huber Corporation, P.O. Box 2831, Borger, Tex. 79008-2831, under the tradename Xevex ® cobweb whiskers.

The microfiber diameter and aspect ratio of the microfibers are critical. If the aspect ratio is too small, the microfibers function merely as a filler, increasing the resin viscosity and, in general, decreasing the physical properties of the finished composite. If the aspect ratio is too large, the microfibers will be found randomly oriented on top of the fiber-reinforcing substrate. In this orientation, little if any toughening will take place, although the tensile strength of the composites prepared from such prepregs may be elevated somewhat.

It has been discovered that microfiber diameters of 1 to 70 nm, preferably 2 to 50 nm and particularly 2 to 20 nm with a median diameter of approximately 10 nm are highly suitable for the practice of the subject invention. Of course, in any microfiber sample there are likely to be some microfibers which fall outside the designated range. Preferably, the above-identified ranges include 67 percent and, more preferably, 95 percent of the fibers in any given sample.

It is important that appropriate aspect ratios be maintained. Aspect ratios of from about 8 to 200, preferably from about 8 to 150, and most preferably from about 10 to 100 are suitable. If the microfibers have aspect ratios lower than about 8, physical properties may tend toward lower values without any increase in toughness.

Microfibers suitable for the practice of the invention may be grown as individual "whiskers." When so manufactured, these microfibers require no further processing other than the optional addition of a coupling agent prior to their incorporation into the matrix resin, provided, of course, that the diameter and aspect ratios fall within the designated ranges.

The preferred cobweb whiskers are produced by a continuous process. This process results in the formation of fibrous balls of whiskers having a higher concentration of whiskers near the center of the cobweb "ball." In order to use such cobweb whiskers in the process of the subject invention, the fibrous balls must be broken up, or "individualized," to form microfibers having the appropriate diameter and aspect ratio. There are many conventional techniques for individualizing these fiber bundles. Examples are grinding operations, chopping operations, ball milling, sand milling, colloidal milling, and so forth. Not all of these methods are equally suitable, however, as not all are capable of maintaining the proper aspect ratio of the fibers.

A superior technique for individualizing cobweb whiskers into microfibers having aspect ratios of c.a. 10 to 50 is the use of a commercial homogenizer under conditions of high shear. These conditions are readily established by utilizing appropriate resin systems as the liquid vehicle. Such resin systems must have appreciable viscosity at convenient homogenization temperatures. By selecting resins of varying viscosities or by changing the viscosity of a selected resin by increasing or decreasing the homogenization temperature, the viscosity may be increased or decreased as desired.

For any given microfiber, the appropriate homogenization conditions are rapidly established through trial and error. If the resultant resin/microfiber premix contains numerous bundles of non-individualized fibers or fibers having too great an aspect ratio, then the viscosity of the resin vehicle must be increased by utilizing a more viscous resin or by operating at a lower temperature. Alternatively, the homogenization time may be increased. If the individualized fibers have too small an aspect ratio, the viscosity of the homogenization liquid may be lowered or the homogenization time decreased.

In the examples which follow, the microfibers were derived from Xevex ® XPV1 cobweb whiskers. The 500 to 10,000 nm diameter fibrous bundles were individualized utilizing a Tekmar SD45 homogenizer. A premix was prepared, utilizing as the homogenization vehicle either MY720, a tetraglycidyl methylenediamine epoxy resin available from the Ciba Geigy Corporation, Hawthorne, N.Y., or DER ® 331, a bisphenol A based diglycidyl ether having an epoxy equivalent weight of approximately 190. However, unmodified conventional prepreg matrix resin systems may also be used when the resin viscosity is suitable. The homogenization was conducted at 80° to 100° C. of or a period of approximately 30 minutes.

The fiber reinforcement utilized in the prepregs of the examples is Celion® carbon fabric 3K-70P, available from BASF Structural Materials, Inc., Charlotte, N.C. Resin impregnation was controlled to give a 35 percent by weight resin loading based on the total prepreg weight. Composites were prepared by laying up 16 plies to form a quasi-isotropic panel. The panel was autoclave cured for two hours at 180° C. and 85 psig. Following initial cure, the panels were subjected to a six-hour post-cure at 180° C. and atmospheric pressure.

Finished panels measuring 15 cm by 15 cm were then impacted with a falling weight impactor at various energy levels. The damage area caused by the impact was determined by inspecting the impacted panel with ultrasonic C-scan.

EXAMPLE 1

A composite panel is fabricated as described above. The matrix resin is a commercial, 4,4′-diaminodiphenylsulfone cured epoxy resin formulation as utilized as a prepregging resin by the Narmco Materials Division, BASF Structural Materials, 1440 North Kraemer Boul., Anaheim, Calif., under the designation of Rigidite® 5208. Prepregs are prepared utilizing the stock resin formulation and the same resin formulation to which the microfibers have been added to give a microfiber content of 8.65 percent by weight relative to total resin weight. Table I summarizes the impact-induced damage at various impact levels.

| Impact Level [in lb/in] | Damage Area, [in]² | |
|---|---|---|
| | 5208 Resin | 5208 Resin + 8.65% microfiber |
| 183 | 0.09 | No Damage |
| 219 | 0.25 | No Damage |
| 255 | 0.30 | 0.23 |
| 292 | 0.39 | 0.28 |

As can be seen from Table I, the addition of 8.65 percent by weight of microfibers has not only increased the impact-damage threshold, but has also decreased the damage area at given impact levels.

EXAMPLE 2

A further example is performed to illustrate the effect of whisker addition to a matrix resin specially formulated for increased toughness. The matrix resin is composed of 67 percent by weight of DER® 331 epoxy resin available from the Dow Chemical Corporation, Midland, Mich., and 33 percent by weight of 4,4′-diaminodiphenyl sulfone. DER® 331 is a epoxy resin composed predominately of the diglycidyl ether of bisphenol A. This particular resin system is tougher than the 5208 resin used in Example 1 but has considerably lower tensile modulus. Table II summarizes the results obtained in panels prepared from this resin and the same resin containing 3 percent and 5 percent microfibers.

TABLE II

| Impact Level [in lb/in] | Damage Area, [in]² | | |
|---|---|---|---|
| | Control = 67% DER 331 + 33% DDS | Resin with 3% Microfibers | Resin with 5% Microfibers |
| 292 | No Damage | No Damage | No Damage |
| 328 | 0.12 | No Damage | 0.01 |

TABLE II-continued

| Impact Level [in lb/in] | Damage Area, [in]² | | |
|---|---|---|---|
| | Control = 67% DER 331 + 33% DDS | Resin with 3% Microfibers | Resin with 5% Microfibers |
| 365 | 0.16 | 0.03 | 0.03 |
| 400 | — | 0.06 | 0.05 |

This table shows that microfibers are effective in further toughening already "tough" resin systems. Tensile modulus measured at 45 degrees to the carbon fiber orientation in all cases was 1.8 msi, indicating that the increase in toughness was not obtained at the expense of modulus. Table II further demonstrates that the amount of microfiber loading is critical. It has been found that microfibers in the amount of less than about 1 percent fail to significantly increase toughness of composites but merely increase resin viscosity. Optimal microfiber concentrations vary with the particular matrix resin but are generally from 2 to 12 percent, and preferably from 2 to 9 percent. Amounts in excess of 15 percent may cause a rapid loss in properties as the microfiber content increases.

EXAMPLE 3

Because silica is hydrophillic, the inclusion of significant amounts of microfibers consisting predominately of this material in prepreg might be expected to increase water uptake of composites prepared therefrom. Such an effect would result in lower wet glass transition temperatures and lower wet compression strength. The surface of such microfibers may be rendered hydrophobic by treatment with a coupling agent such as 3-glycidoxypropyltrimethoxysilane or 2-(3,4-epoxycyclohexyl)ethyltrimethoxysilane. In addition to forming a hydrophobic microfiber surface, use of such compounds as coupling agents frequently aids compatibility with the matrix resin.

The coupling agent may be added to the microfibers by conventional techniques, i.e. by applying 1 to 10 percent, preferably 2 to 5 percent by weight of coupling agent to microfibers dispersed in a suitable solvent. Alternatively, the coupling agent may be added to the microfiber premix. If the microfibers are added directly to the resin rather than utilizing a premix, the coupling agent may be added directly to the resin also.

In Table III, the results of various impacts on composite panels prepared from a resin system containing microfibers treated with 4 percent by weight relative to microfiber weight of the coupling agent 3-glycidoxypropyltrimethoxysilane are compared with panels prepared from the same system but without microfibers. The resin is the same resin as in Example 2, 67 percent by weight DER® 331 and 33 percent by weight 4,4′-diaminodiphenylsulfone.

TABLE III

| Impact Level [in lb/in] | Damage Area | | |
|---|---|---|---|
| | Resin Without Microfibers | Resin with 3% Microfibers plus Coupling Agent | Resin with 5% Microfibers plus Coupling Agent |
| 292 | No Damage | No Damage | No Damage |
| 328 | 0.12 | 0.01 | 0.02 |
| 365 | 0.16 | 0.08 | 0.11 |
| 400 | — | 0.14 | 0.16 |

Wet compression strengths of six-ply panels prepared from the same prepregs used to prepare the panels of Example 3 are measured by immersing the panels in boiling water for a period of 48 hours. Following water boil, compression strengths are measured at 180° F. (8.2.° C.). The results are presented in Table IV.

TABLE IV

| Hot Wet Compression Strength at 180° F. | |
| --- | --- |
| Composite | Compression Strength |
| Control - no microfibers | 43 ksi |
| 3% microfibers w/coupling agent | 55 ksi |
| 5% microfibers w/coupling agent | 48 ksi |

Again, Tables III and IV illustrate that significant increases in toughness occur at relatively low microfiber loading. In addition to the increase in toughness, compressive strength is not only maintained but somewhat increased.

EXAMPLE 4 (Comparison)

Previously, experiments had been performed to enhance composite toughness by adding chopped fiber to prepreg. In one set of experiments, 3 percent by weight relative to resin weight of 10 mil chopped carbon fibers were added to a commercial bismaleimide-epoxy resin system. Toughness was evaluated by determining GIC values via the double cantilever beam test.

| Composite | $G_{1c}$ in lb/in$^2$ |
| --- | --- |
| Control - no chopped fibers | 2.4 |
| 3% 10 mil chopped c/g fibers | 1.8 |

As can be seen, the addition of chopped fibers does not result in an increase in properties, but instead causes a 25 percent loss in $G_{1c}$.

EXAMPLE 5 (Comparison)

Standard carbon/graphite composites are prepared from conventional matrix resin formulations with and without inclusion of silicon carbide whiskers having diameters of from 0.1 to 0.5 microns and lengths of 10-40 microns. Composites containing the silicon carbide whiskers exhibit a 40 percent loss in modulus and tensile strength measured at 0° to the fiber axis.

The comparison example illustrates that not all microfibers or whiskers are equally effective in increasing modulus. While the microfibers of the subject invention produce composites of increased toughness without a loss of modulus, tensile strength, or compression strength, silicon carbide whiskers cause a severe loss in mechanical properties.

The embodiments of the invention in which an exclusive property or privilege is claimed are defined as follows:

1. A toughened, heat-curable, fiber-reinforced article, comprising:
(a) a heat-curable, thermosetting matrix resin;
(b) one or more laminar plies of woven or non-woven fiber reinforcement;
(c) from about 1 to about 10 percent by weight relative to the weight of component (a) of microfibers characterized by
 (i) diameters of from about 1 to 70 nm;
 (ii) aspect ratios of from about 8 to 100;
 (iii) amorphous silica content of from about 60 to 80 percent by weight;
 (iv) silicon carbide content less than about 8 percent by weight;
wherein said toughened article has greater toughness and substantially the same or greater modulus than the same article without component (c).

2. The toughened article of claim 1 wherein said article is a heat-curable, fiber-reinforced prepreg.

3. The prepreg of claim 2 wherein said thermosetting matrix resin comprises one or more heat-curable resins selected from the group consisting of maleimide-group-containing resins; epoxy-group-containing resins; and cyanate-group-containing resins.

4. The prepreg of claim 3, further comprising one or more unsaturated comonomers having acetylenic, acrylic, allylic, or ethenylic unsaturation.

5. The prepreg of claim 4 wherein said unsaturated comonomer contains allylic unsaturation.

6. The prepreg of claim 2 wherein said microfibers have a composition comprising, in percent by weight:
 amorphous silica: 65-80%
 elemental silicon: 15-25%
 elemental carbon: 0.5-5.0%
 silicon carbide: <5.0%

7. The prepreg of claim 6 wherein said microfibers have diameters of from about 2 to 50 nm and aspect ratios of 10 to 100.

8. The prepreg of claim 7 wherein said microfibers have a mean diameter of 10 nm.

9. The prepreg of claim 2 wherein said microfibers have diameters of from about 2 to 50 nm and aspect ratios of 10 to 100.

10. The prepreg of claim 9 wherein said microfibers have a mean diameter of 10 nm.

11. The prepreg of claim 9 wherein said thermosetting matrix resin comprises one or more epoxy resins.

12. The prepreg of claim 11 which further comprises 4,4'-diaminodiphenylsulfone.

13. The prepreg of claim 9 wherein said matrix resin comprises N,N'-bismaleimido-4,4'-methylenedianiline.

14. The prepreg of claim 13 further comprising as a comonomer, 2,2'-diallylbisphenol A.

15. A toughened, heat-curable, fiber-reinforced article, comprising an assembly of two or more plies of the prepreg of claim 9.

16. The prepreg of claim 9 wherein said fiber-reinforcement is selected from the group consisting of high strength, continuous fibers, of glass, carbon/graphite, aramid, and polyethylene.

17. The prepreg of claim 2 wherein said microfibers are treated with a hydrophobic coupling agent.

18. The prepreg of claim 17 wherein said coupling agent is an epoxyalkyltrialkoxysilane.

19. The prepreg of claim 18 wherein said coupling agent is selected from the group consisting of 3-glycidoxypropyltrimethoxysilane and 2-(3,4-epoxycyclohexyltrimethoxysilane.

20. The prepreg of claim 17 wherein said microfibers are present in an amount of from 2 to 5 percent by weight.

21. A toughened, heat-curable, fiber-reinforced article, comprising an assembly of two or more plies of the prepreg of claim 2.

22. The prepreg of claim 2 wherein said fiber-reinforcement is selected from the group consisting of high strength, continuous fibers, of glass, carbon/graphite, aramid, and polyethylene.

23. The prepreg of claim 22 wherein said microfibers are present in an amount of from 2 to 5 percent by weight.

24. A cured, toughened, fiber-reinforced article prepared by the process of curing a curable fiber-reinforced article at a curing temperature sufficient to effectuate a cure, over a time period effective to effect a cure at said curing temperature, wherein said cured fiber-reinforced article prior to curing comprises two or more plies of the heat-curable prepreg of claim 2.

* * * * *